(12) United States Patent
Linhart et al.

(10) Patent No.: US 7,591,951 B2
(45) Date of Patent: Sep. 22, 2009

(54) FUEL FILTER SYSTEM AND METHOD OF OPERATING SAME

(75) Inventors: Jochen Linhart, Waiblingen (DE); Michael Micke, Stuttgart (DE); Michael Fasold, Auenwald (DE)

(73) Assignee: Mann & Hummel GmbH, Ludwigsburg (DE)

( * ) Notice: Subject to any disclaimer, the term of this patent is extended or adjusted under 35 U.S.C. 154(b) by 532 days.

(21) Appl. No.: 11/295,449

(22) Filed: Dec. 7, 2005

(65) Prior Publication Data
US 2006/0118478 A1    Jun. 8, 2006

(30) Foreign Application Priority Data
Dec. 7, 2004   (DE) ..................... 10 2004 059 062

(51) Int. Cl.
*B01D 61/00* (2006.01)
*B01D 63/00* (2006.01)
(52) U.S. Cl. .............. 210/651; 210/257.2; 210/261; 210/195.2; 210/295
(58) Field of Classification Search ............ 210/97, 210/295, 651, 261, 257.2, 232, 90, 86, 444, 210/453, 195.2, 136; 55/482
See application file for complete search history.

(56) References Cited

U.S. PATENT DOCUMENTS

| | | | | |
|---|---|---|---|---|
| 3,105,042 A | * | 9/1963 | Roosa | 210/94 |
| 4,276,161 A | * | 6/1981 | Matsui et al. | 210/86 |
| 4,321,136 A | * | 3/1982 | Matsui | 210/86 |
| 4,372,847 A | * | 2/1983 | Lewis | 210/86 |
| 4,470,301 A | * | 9/1984 | Hutchins et al. | 73/304 R |
| 4,502,954 A | * | 3/1985 | Druffel | 210/136 |
| 5,151,180 A | * | 9/1992 | Giordano et al. | 210/264 |
| 6,290,743 B1 | * | 9/2001 | Alvin et al. | 55/482 |
| 6,974,537 B2 | * | 12/2005 | Abdelqader | 210/86 |
| 7,285,209 B2 | * | 10/2007 | Yu et al. | 210/195.2 |

FOREIGN PATENT DOCUMENTS

| | | |
|---|---|---|
| DE | 10138365 A1 | 2/2003 |
| EP | 0106737 A2 | 4/1984 |
| EP | 102004059062 A1 * | 6/2006 |
| EP | 1726818 A2 * | 11/2006 |
| JP | 64-11609 A | 1/1989 |
| WO | WO2004065780 A1 | 8/2004 |

OTHER PUBLICATIONS

European Search Report dated Mar. 31, 2006 (Seven (7) Pages).

* cited by examiner

*Primary Examiner*—Ana M Fortuna
(74) *Attorney, Agent, or Firm*—Crowell & Moring LLP

(57) ABSTRACT

A fuel filter for cleaning fuel, particularly for engines of motor vehicles, having a filter housing (10) with an inlet (14), an outlet (15), and a filter element (16) for cleaning the fuel situated between the inlet (14) and the outlet (15). A collecting space (20) for water separated from the fuel additionally is provided in the filter housing (10), and a water discharge device (23) having a housing (24) is also arranged in the filter housing. Discharge device housing (24) has an inlet (33) and an outlet (28), between which a membrane (25) that is permeable for water molecules is situated, and the water-permeable membrane (25) has channel structures (26) which are closed in a sealed manner at their upper ends.

12 Claims, 3 Drawing Sheets

FUEL FILTER SYSTEM AND METHOD OF OPERATING SAME

BACKGROUND OF THE INVENTION

The present invention relates to a fuel filter system, especially a system for filtering diesel fuel, and to a method of operating such a fuel filter system.

Published German patent application no. DE 101 38 695 discloses a device for removing water from a fuel system. The fuel system has a filter element on which water is deposited. The deposited water collects in a collecting space. Beneath the collecting space there is a catchment area, with a membrane provided between the collecting space and the catchment area. The membrane is constructed so that only ultra-pure water can pass through it. The membrane is not permeable to fuel molecules. A water sensor situated in the collecting space is connected to a valve provided in the catchment area.

SUMMARY OF THE INVENTION

It is an object of the present invention to provide an improved fuel filter system.

Another object of the invention is to provide a fuel filter system which has a compact water separator.

An additional object of the invention is to provide an improved method of operating a fuel filter system.

These and other objects are achieved in accordance with the present invention by providing a fuel filter comprising a filter housing with a fuel inlet and a fuel outlet, a filter element for cleaning fuel situated in said filter housing between the inlet and the outlet, and a water discharge device disposed in said housing, said filter housing including a collecting space for collecting water separated from the fuel, wherein said water discharge device comprises a discharge device housing with a water discharge inlet, a water discharge outlet and a water-permeable membrane arranged in the discharge device housing between the water discharge inlet and outlet, said water-permeable membrane having channel structures which are closed in a sealed manner at their upper ends.

In accordance with a further aspect of the invention, the objects are achieved by providing a method for operating a fuel filter comprising collecting separated water contaminated with residual amounts of fuel in a collecting space in a filter housing, introducing contaminated water from the collecting space through a water discharge inlet into a water discharge device containing a water-permeable membrane, passing water molecules through the water-permeable membrane due to a pressure difference across the membrane, whereby the water is freed of residual fuel, and collecting water freed from residual fuel after passage through the membrane and discharging the water freed from residual fuel to the environment.

The fuel filter according to the invention is used for cleaning fuel, especially diesel fuel, in motor vehicles or operating machines. The fuel filter comprises a filter housing with an inlet for unfiltered fuel and an outlet for filtered fuel. A filter element which separates the inlet from the outlet in a sealing manner is provided in the filter housing. In addition, water contained in the fuel is deposited on the filter element. Water which separates is heavier than the fuel, so the water settles to the lower area of the fuel filter, collecting in a collecting space. A water discharge device is situated in the area of the collecting space and has a housing. The housing has an inlet and an outlet. A membrane that is permeable for water molecules is situated in the housing, separating the inlet from the outlet. The membrane which is made, for example, of a polymeric material has channel structures which are sealed at one end. The closure is produced by a water-resistant and fuel-resistant material so that the closure permanently closes the channel structures. In addition, the closure is impermeable at least for fuel components.

In one advantageous embodiment, the closure is comprised of the same material as the membrane itself, so the area of the closure may also be used as the membrane surface. The water present in the collecting space is still contaminated with fuel components, so this water must not be discharged to the environment without being cleaned. This contaminated water enters through the inlet into the housing of the water discharge device and wets the membrane. Since the channel structures are closed at one end, the contaminated water cannot enter the channel structures directly. When there is a pressure difference between the outside of the membrane and the channel structure, water molecules pass from the contaminated water through the membrane. The fuel components remain on the other side of the membrane.

The water molecules passing through the membrane combine to form water droplets, which can be discharged directly from the water discharge device to the environment. To this end, the water droplets flow out through the open end of the channel structures. The open ends open into a base which has a drainage channel. In the drainage channel the water droplets of the individual channel structures are combined and discharged. By using a membrane having channel structures, a relatively large membrane surface area can be produced in a relatively small construction space. To this end, the membrane may be designed as a flat or round membrane which has integrated channels. However, it is also possible to use individual hollow fibers which are packed together in a bundle. The pressure difference between the outside of the membrane and the channel structure can be created by the pressure prevailing in the filter housing which is introduced through a fuel pump. The pressure in the channel structure may then, for example, be ambient pressure.

In accordance with one advantageous embodiment, the membrane is comprised of an inorganic material, in particular a ceramic. This material is stable even at variable temperatures. Neither very high temperatures nor very low temperatures will destroy this material, so that durable functioning of the water discharge device is assured.

In accordance with another advantageous embodiment of this invention, a valve is provided between the inlet and the outlet so that flow can either pass through the water discharge device in a controlled manner or be prevented. The arrangement of the valve between the inlet and the membrane is especially advantageous because in the closed state, the valve prevents the fuel from coming in direct contact with the membrane and clogging the membrane. Only when a sufficient amount of water is available is the valve opened so that water can flow to the membrane. To determine whether a sufficient amount of water is present in the collecting space, a sensor may be provided in the collecting space and operatively connected to the valve. This sensor communicates with the valve so that the valve is opened when the quantity of water is sufficient and/or is closed when the quantity of water drops below a minimum water level.

In yet another advantageous embodiment of the present invention, the housing has a dead space in which residual fuel separated by the membrane collects. The dead space is arranged in the geodetically upper area of the housing. Since the residual fuel retained by the membrane is lighter than water, this residual fuel rises to the top—supported by the vibrations that are constantly present during operation of the engine, and collects there. Vibrations, in particular high-frequency vibrations, may also be induced in a controlled manner to support the separation of residual fuel from the membrane surface. Reinforcing or damping elements may be provided in certain areas of the vehicle body to transmit the vibrations to the fuel filter system. In this way the membrane surface is freed of residual fuel and is not blocked by accumulations of residual fuel.

In another embodiment of this invention, the dead space has a drain valve which communicates with the collecting space in the filter housing. This drain valve may be opened when a larger quantity of residual fuel has collected in the dead volume. The residual fuel escapes into the collecting space of the filter housing when the drain valve is opened and can be sent to be used for combustion. At the same time, the service life of the membrane is increased because the membrane surface area is not clogged but instead is available for the water to be discharged.

It is advantageous if the water discharge device is detachably connected to the collecting space, in particular by a screw connection. This achieves a faster and simpler method of changing the water discharge device.

In yet another embodiment of the invention, the outlet is connected to a pump, so that a pressure which differs from the internal pressure of the filter housing can be generated in the water discharge device. The pump may be a vacuum pump or an pressurizing pump which can force or draw the water molecules through the membrane. Instead of a pump, existing pressure accumulators such as those present in a motor vehicle, for example, may also be used. This makes it possible to eliminate the space and the expense required for the pump.

In accordance with the method of the invention for operating a fuel filter as described above, contaminated water separated in the collecting space flows through the inlet into the water discharge device. Water molecules travel from the fuel-contaminated water through the membrane due to a pressure difference between the inlet and the outlet and then can be discharged as pure water to the environment.

In accordance with one advantageous embodiment, the membrane is exposed to the contaminated water only after a defined period of time. To this end, a valve is opened, releasing the flow path to the membrane. The period of time may be a predetermined period of time after starting operation of the fuel filter. The period of time is selected so that a sufficient amount of water will be present in the collecting space in order to avoid clogging the membrane with fuel.

In addition, the period of time may also be a period of time after the internal combustion engine has been shut down. After shutting down the internal combustion engine, fuel no longer flows through the fuel filter, so the fuel-water mixture separates on its own. As a result of this separation process, water with a lower fuel concentration is sent to the membrane, which thus increases the lifetime of the membrane.

In an advantageous method, the periods of time provided result in unpressurized states on the membrane. These periods of time may occur before, during or after operation of the fuel filter. The length of the periods of time is selected so that the residual fuel has enough time to diffuse out of the membrane. For the purposes of this invention, a period of time may amount to a few minutes, for example. In other embodiments, however, the period of time may also last for several hours, but of course any intermediate value may also be selected. In these periods of time, the membranes are isolated from the pressure prevailing in the fuel filter. Other pressure sources such as pumps are also isolated from the membranes during these periods of time so that a higher pressure level does not prevail outside of the membrane than inside the channel structures of the membrane. During these periods of time, there is back-diffusion of the residual fuel back out of the membrane into the water surrounding the membrane. No particular drive is necessary for this back-diffusion because the concentration differences are sufficient. Due to this back-diffusion, the cover layer of residual fuel becomes separated from the membrane and/or no cover layer is formed. Vibration can be induced to support the separation process.

As an alternative, the membrane may also be backwashed by having pressure act on the membrane in the direction opposite the regular direction of flow. To this end, a higher pressure in relation to the pressure surrounding the membrane is generated in the channel structures. The lifetime of the membrane can be greatly prolonged by periods of time with pressureless states.

BRIEF DESCRIPTION OF THE DRAWINGS

The invention will be described in further detail with reference to illustrative preferred embodiments shown in the accompanying drawing figures, in which.

DETAILED DESCRIPTION OF PREFERRED EMBODIMENTS

Figure 1:
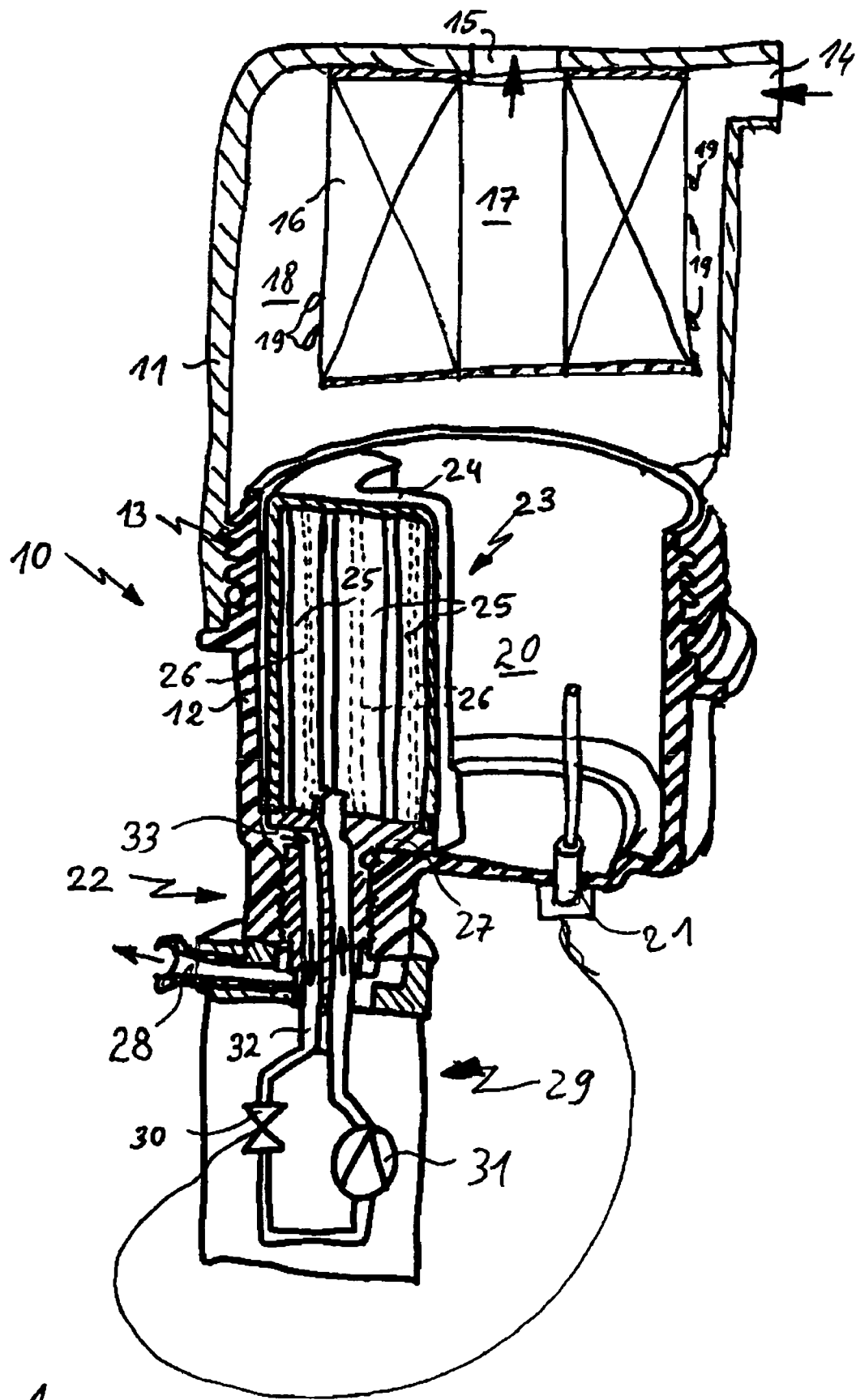
FIG. 1 is a sectional view of a fuel filter according to the present invention.

FIG. 1 shows a sectional view of a fuel filter according to the invention. The fuel filter comprises a filter housing 10 which has a top part 11 and a bottom part 12. The top part 11 is connected in a sealed manner to the bottom part 12 by a screw connection 13. In addition, the top part 11 has an inlet 14 and an outlet 15. A filter element 16 is arranged between the inlet 14 and the outlet 15. The filter element 16 surrounds a filtered liquid side 17 which is separated in a sealed manner from the unfiltered liquid side 18 which communicates with the inlet 14. Water droplets 19 are separated by the filter element 16 and settle out in a collecting space 20, which is situated in the bottom part 12 of the filter housing 10. A water sensor 21 is provided in the bottom 12, extending into the collecting space 20 where it detects the level of the water.

The bottom part 12 also has a connection 22 to which a water discharge device 23 is connected by a threaded connection. The water discharge device 23 comprises a two-part housing 24 in which flat membranes 25 are glued in a sealed manner. The outside surfaces of the membranes extend vertically, so that residual fuel which separates can rise upward without obstacle. The membranes 25 have vertically extending channel structures 26 (shown in broken lines) which are closed at their upper ends by the housing 24. At their lower ends, the membranes 25 are connected to a base 27, through which the open ends of the channel structures 26 communicate with an outlet 28. The channel structures 26 may, for example, have a circular cross-sectional area, but of course other cross-sectional areas such as rectangular or oval may also be implemented.

A control unit 29 in which a valve 30 and a pump 31 are arranged is connected to the base 27. The valve is connected by a flow channel 32 to an inlet 33 situated in the base 27. The flow channel 32 is oriented at least partially vertically upstream from the valve 30 so that the water collects in this area. Due to a longer residence time of the water in the flow channel 32, fuel fractions float to the surface and are discharged from the flow channel 32, so that the water in the flow channel 32 is relatively pure.

The fuel to be filtered passes through the inlet 14 into the filter housing 10 in the direction of the arrow. The fuel flows through the filter element 16 and then exits from the filter housing 10 through the outlet 15. The impurities contained in the fuel are separated by the filter element 16. The water contained in the fuel is also separated in the form of droplets 19 on the filter element 16. Since water has a higher density then fuel, the droplets 19 settle out in the collecting space 20 and gradually displace the fuel from this area. The collected water also penetrates into the flow channel 32, where it also displaces the fuel. After a substantial quantity of water has collected, this is detected by the sensor 21 which sends a signal to the valve 30. The valve 30 opens, and the pump 31 begins to convey the water into the water discharge device 23 against the pressure prevailing in the filter housing 10. This embodiment is to be used in a fuel filter operated in suction operation. If the fuel filter is operated in pressure operation, the pump 31 may also be omitted.

The water is located inside the housing 24. Due to the pressure prevailing in the housing 24, the water molecules are forced through the membrane 25 and collect in the channel structures 26 as pure water. The water then flows out of the channel structures 26, passing through the base 27 to the outlet 28 where the water can be discharged to the environment with no objection. As soon as the water level in the collecting space 20 has dropped below a defined level, the sensor 21 sends a corresponding signal to the valve 30, causing the valve to close the flow channel 32.

Figure 2:
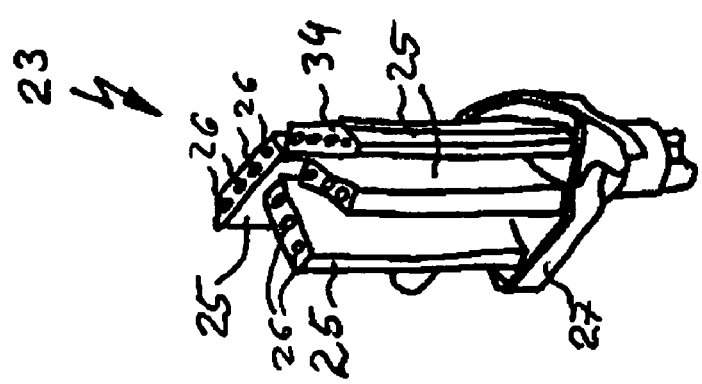
FIG. 2 is perspective view of a water discharge device without a housing.

FIG. 2 depicts the water discharge device 23 without the housing 24. Parts corresponding to those illustrated in FIG. 1 are identified by the same reference numerals. The membranes 25 are constructed as flat components with vertically extending channel structures 26. The channel structures 26 are sealed at their upper end 34. The seal may also be accomplished by a sealing disk introduced into the housing 24.

Figure 3:
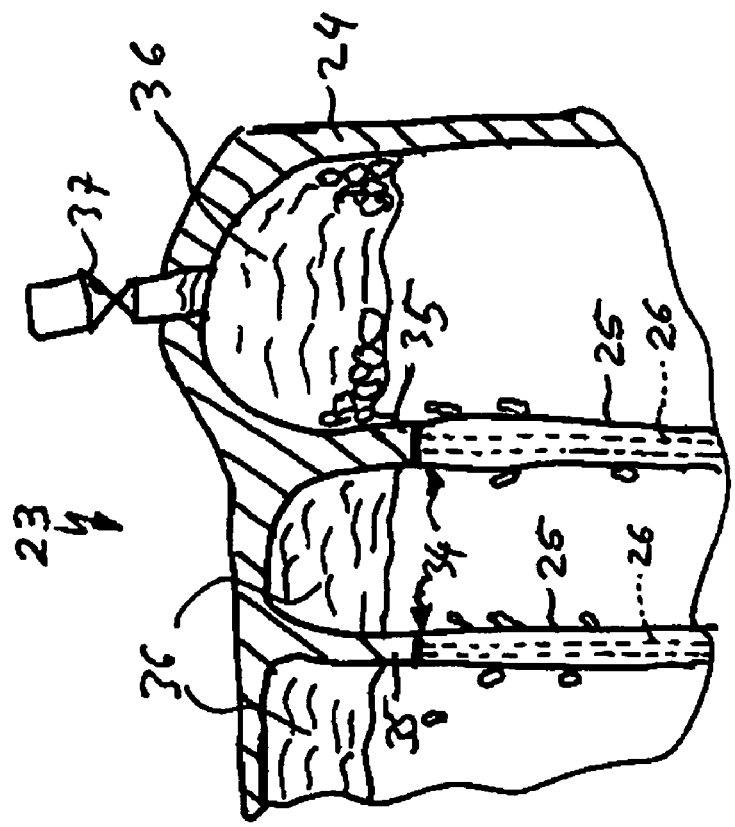
FIG. 3 is a detail sectional view of a water discharge device.

FIG. 3 is a sectional detail view of a water discharge device 23. The membranes 25 are connected in a sealed manner at their upper ends 34 to webs 35, with the webs 35 being molded on the housing 24 in one piece. In other embodiments, the webs 35 may also be constructed separately and connected to the housing 24. Due to the connection of the webs 35 to the membranes 25, the upper ends 34 of the membranes 25 are sealed. In addition, the webs 35 together with the housing 24 form a dead space 36 in which the residual fuel separated at the membrane 25 can collect. The dead space 36 has a drain valve 37 through which the residual fuel can escape from the dead space 36. This residual fuel then flows back into the filter housing 10 where it is returned to the supply of fuel.

Figure 4:
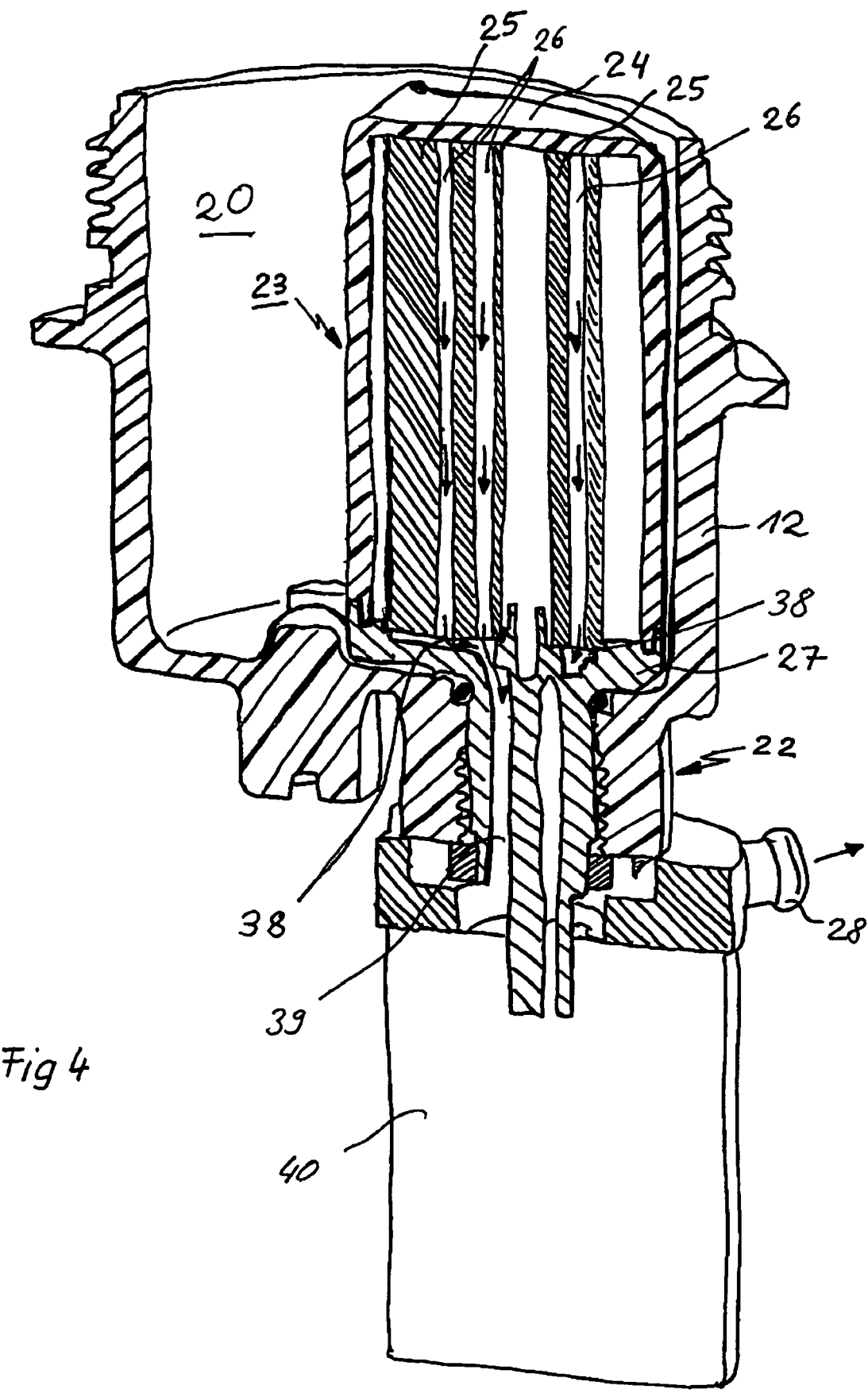
FIG. 4 is a sectional detail view of the fuel filter of the invention.

FIG. 4 shows a detail sectional view of the fuel filter of FIG. 1. Parts corresponding to those shown in FIG. 1 are again identified by the same reference numerals. The upper ends of membranes 25 are attached to the housing 24 in such a way that the channel structures 26 are sealed. The lower ends of the membranes 25 are connected to the base 27, with the base 27 having a drainage channel 38. The open lower ends of the channel structures 26 open into this drainage channel 38. The drainage channel 38 is constructed so that all the channel structures 26 open into the drainage channel 38. To this end the drainage channel 38 has multiple side arms which extend in the base 27 according to the layout of the membranes 25. The drainage channel 38 opens into a central down tube 39. For better discharge of the water droplets, the drainage channel 38 slopes downwardly toward the down tube 39.

The water droplets which accumulate in the channel structures 26 collect in the drainage channel 38 and are directed in the direction of the arrow through the down tube 39 into a water-collecting space 40. The outlet 28 through which the water can be discharged, is connected to this water-collecting space 40.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A fuel filter comprising a filter housing with a fuel inlet and a fuel outlet, a filter element for cleaning fuel situated in said filter housing between the inlet and the outlet, and a water discharge device disposed in said housing, said filter housing including a collecting space for collecting water separated from the fuel, wherein said water discharge device comprises a discharge device housing with a water discharge inlet, a water discharge outlet and a water-permeable membrane arranged in the discharge device housing between the water discharge inlet and outlet, said water-permeable membrane having channel structures which are closed in a sealed manner at their upper ends and open at their lower ends, the channel structures being arranged to receive water molecules which pass through the water-permeable membrane and combine to form water droplets, wherein the open lower ends of the channel structures open into a separated water receiving area of the discharge device housing which is arranged to receive the water droplets discharged from the open lower ends of the channel structures.

2. A fuel filter according to claim 1, wherein the membrane is made of an inorganic material.

3. A fuel filter according to claim 2, wherein is said inorganic material is a water-permeable ceramic material.

4. A fuel filter according to claim 1, wherein the discharge device housing includes a dead space in which residual fuel separated by the membrane collects.

5. A fuel filter according to claim 4, wherein the dead space communicates with the collecting space via a drain valve.

6. A fuel filter according to claim 1, wherein the water discharge device is detachably connected to the collecting space.

7. A fuel filter according to claim 1, wherein the water discharge outlet is connected to a pump so that a pressure which differs from the internal pressure of the filter housing can be generated in the water discharge device.

8. A fuel filter according to claim 1, wherein the fuel filter is connected to a fuel supply line of a diesel internal combustion engine of a motor vehicle.

9. A fuel filter comprising a filter housing with a fuel inlet and a fuel outlet, a filter element for cleaning fuel situated in said filter housing between the inlet and the outlet, and a water discharge device disposed in said housing, said filter housing including a collecting space for collecting water separated from the fuel, wherein said water discharge device comprises a discharge device housing with a water discharge inlet, a water discharge outlet and a water-permeable membrane arranged in the discharge device housing between the water discharge inlet and outlet, said water-permeable membrane having channel structures which are closed in a sealed manner at their upper ends, further comprising a valve situated between the water discharge inlet and the water discharge outlet for controlling water flow to said water-permeable membrane.

10. A fuel filter according to claim 9, further comprising a water level sensor in said collecting space, wherein said sensor is operatively connected to said valve for controlling water flow to said water-permeable membrane.

11. A method for operating a fuel filter comprising:
filtering fuel through a fuel filter located in a filter housing;
collecting water contaminated with residual amounts of fuel separated from a fuel by the fuel filter in a collecting space in the filter housing;
introducing contaminated water from the collecting space through a water discharge inlet into a water discharge device containing a water-permeable membrane;
passing water molecules through the water-permeable membrane due to a pressure difference across the membrane, whereby the water is freed of residual fuel, and
collecting water freed from residual fuel after passage through the membrane and discharging the water freed from residual fuel to the environment,
wherein said water-permeable membrane has channel structures which are closed in a sealed manner at their upper ends and open at their lower ends, the channel structures receiving water molecules which pass through the water-permeable membrane and combine to form water droplets, wherein the open lower ends of the channel structures open into a separated water receiving area of the discharge device housing which receives the water discharged from the open lower ends of the channel structures.

12. A method according to claim 11, wherein the introduction of contaminated water to the water-permeable membrane is delayed for a period of time after start-up of the fuel filter sufficient to allow accumulation of enough contaminated water to prevent direct exposure of the membrane to the fuel.

* * * * *